United States Patent
Sekiguchi

(10) Patent No.: US 8,826,946 B2
(45) Date of Patent: Sep. 9, 2014

(54) METHOD FOR RECOVERING PUNCTURE REPAIR LIQUID

(75) Inventor: Takumi Sekiguchi, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 13/885,969

(22) PCT Filed: Jun. 9, 2011

(86) PCT No.: PCT/JP2011/063223
§ 371 (c)(1),
(2), (4) Date: May 16, 2013

(87) PCT Pub. No.: WO2012/066812
PCT Pub. Date: May 24, 2012

(65) Prior Publication Data
US 2013/0233405 A1 Sep. 12, 2013

(30) Foreign Application Priority Data
Nov. 19, 2010 (JP) .................................. 2010-259493

(51) Int. Cl.
| B65B 31/00 | (2006.01) |
| B29C 73/16 | (2006.01) |
| B29C 73/02 | (2006.01) |
| B60C 25/00 | (2006.01) |
| B29C 73/22 | (2006.01) |
| B29L 30/00 | (2006.01) |

(52) U.S. Cl.
CPC .............. *B60C 25/00* (2013.01); *B29C 73/166* (2013.01); *B29L 2030/00* (2013.01); *B29C 73/02* (2013.01); *B29C 73/22* (2013.01)
USPC .................................. 141/8; 141/38; 141/66

(58) Field of Classification Search
CPC .............................. B29C 73/166; B60C 5/004
USPC ............................................ 141/8, 38, 65, 66
See application file for complete search history.

(56) References Cited

U.S. PATENT DOCUMENTS 4,700,531 A * 10/1987 Hsu et al. .......................... 53/412
5,927,348 A * 7/1999 Gerresheim et al. ............ 141/65

(Continued)

FOREIGN PATENT DOCUMENTS

| JP | 10-67212 A | 3/1998 |
| JP | 2003-127242 A | 5/2003 |
| JP | 2004-114524 A | 4/2004 |
| JP | 2005-138400 A | 6/2005 |
| JP | 2007-331210 A | 12/2007 |

(Continued)

OTHER PUBLICATIONS

International Search Report for the Application No. PCT/JP2011/063223 mailed Jul. 5, 2011.

*Primary Examiner* — Jason K Niesz
(74) *Attorney, Agent, or Firm* — Cheng Law Group, PLLC

(57) ABSTRACT

A valve core is removed from a tire valve 3 of a wheel 2 with a tire 1 where puncture repair liquid 4 has been injected. Pressurized air filled in the tire 1 is discharged via the tire valve 3. A tube 10 is inserted through the tire valve 3 to bring the tube 10 to a liquid surface of the puncture repair liquid 4 while the pressurized air in the tire 1 is being discharged. The puncture repair liquid 4 in the tire 1 is recovered via the tube 10 using a residual pressure in the tire 1. In this manner, the puncture repair liquid can efficiently be recovered without cutting off the tire valve.

10 Claims, 9 Drawing Sheets

(56) References Cited

U.S. PATENT DOCUMENTS

| | | | |
|---|---|---|---|
| 6,332,711 B1 * | 12/2001 | Inuzuka et al. | 383/9 |
| 7,658,543 B2 * | 2/2010 | Shiokawa et al. | 383/107 |
| 2008/0089618 A1 * | 4/2008 | Blythe | 383/25 |

FOREIGN PATENT DOCUMENTS

| | | |
|---|---|---|
| JP | 2009-41006 A | 2/2009 |
| JP | 2009-90574 A | 4/2009 |
| JP | 2009-90862 A | 4/2009 |

* cited by examiner

METHOD FOR RECOVERING PUNCTURE REPAIR LIQUID

TECHNICAL FIELD

The present invention relates to a method for recovering puncture repair liquid injected in a tire. More specifically, the present invention relates to a method for recovering puncture repair liquid that allows the efficient recovery of the puncture repair liquid without cutting off a tire valve.

BACKGROUND ART

Recently, when a tire mounted to a vehicle is blown out, puncture repair liquid is injected in the tire via a tire valve. This temporarily repairs the puncture and fills the tire with air at the same time.

However, with the above-described puncture repair method, the puncture repair liquid remains in the tire. When the tire is removed from a wheel for exchange, therefore, the puncture repair liquid overflows from the tire. This may cause inconvenience that a component such as a tire changer is contaminated.

As a countermeasure against this problem, various methods to prevent overflow of the puncture repair liquid have been proposed. For example, the following have been proposed. Emulsion coagulant is injected in the tire where the puncture repair liquid remains. This solidifies the puncture repair liquid, and then the solidified product of the puncture repair liquid is disposed of after the tire is removed from the wheel (for example, see Patent Document 1). However, in this case, there is a drawback. Injection of the emulsion coagulant in the tire mounted to the wheel is difficult.

Further, the following has been proposed. A tire valve is cut off from the wheel, a tube is inserted through a mounting hole of the tire valve into the tire so as to discharge the puncture repair liquid inside the tire via the tube (for example, see Patent Documents 2 to 4). However, in this case, cutting off the tire valve is required, and a drawback arises in that the tire valve cannot be reused.

The following has also been proposed. A pipe that forms a gas flow passage and a pipe that forms a liquid flow passage are inserted into a tire valve. Pressurized air is introduced into the tire via the gas flow passage while puncture repair liquid is discharged to the outside of the tire via the liquid flow passage (for example, see Patent Document 5). However, in this case, it is necessary to insert the pipe that forms the gas flow passage and the pipe that forms the liquid flow passage into the tire valve; therefore, the liquid flow passage has to be extremely narrow. This creates a drawback that discharge of the puncture repair liquid takes much time.

Patent Document 1: JP-A-2009-41006
Patent Document 2: JP-A-2003-127242
Patent Document 3: JP-A-10-67212
Patent Document 4: U.S. Pat. No. 5,927,348
Patent Document 5: JP-A-2007-331210

DISCLOSURE OF THE INVENTION

Problems to be Solved by the Invention

It is an object of the present invention to provide a method for recovering puncture repair liquid that allows the efficient recovery of the puncture repair liquid without cutting off a tire valve.

Solutions to the Problems

A method for recovering puncture repair liquid includes removing a valve core from the tire valve of the wheel with the tire where puncture repair liquid has been injected, discharging pressurized air filled in the tire via the tire valve, inserting the tube through the tire valve so as to bring the tube to a liquid surface of the puncture repair liquid while discharging the pressurized air in the tire, and recovering the puncture repair liquid in the tire via the tube using a residual pressure in the tire.

In the present invention, a valve core is removed from a tire valve of a wheel with a tire where puncture repair liquid has been injected. Pressurized air filled in the tire is discharged via the tire valve. The tube is inserted through the tire valve so as to bring the tube to a liquid surface of the puncture repair liquid while discharging the pressurized air in the tire. The puncture repair liquid in the tire is recovered via the tube using a residual pressure in the tire. In this case, the tire valve does not have to be cut off. This allows using the tire valve intact after recovery of the puncture repair liquid. Additionally, the tube can be thickened as much as possible within an allowed range of the tire valve. This allows the puncture repair liquid to be recovered in a short time compared with the conventional structure where a pipe that forms a gas flow passage and a pipe that forms a liquid flow passage are inserted into a tire valve. Therefore, according to the present invention, the puncture repair liquid can efficiently be recovered without cutting off a tire valve. Furthermore, according to the present invention, there is an advantage that the apparatus for recovering puncture repair liquid need not be complicated and can be constituted with a small number of components.

In the present invention, the following is preferred. The tube has an outer diameter smaller than an inner diameter of a thinnest portion of a through hole of the tire valve. The tube has an inner diameter within a range of 50% to 90% of the outer diameter thereof. Especially, it is preferred that the tube have an outer diameter within a range of 2.5 mm to 3.0 mm. This provides a certain amount of stiffness to the tube. Therefore, ease of insertion into the tire valve is ensured while discharge efficiency of the puncture repair liquid is enhanced.

In the present invention, the tube is inserted through the tire valve into the tire while pressurized air in the tire is being discharged. Then, the tube may be brought to a liquid surface of the puncture repair liquid by changing an arranged state of the tire. In this case, insertion work of the tube is completed, and then the tube may be brought to a liquid surface of the puncture repair liquid by changing an arranged state of the tire so as to recover the puncture repair liquid. Therefore, the puncture repair liquid is not discharged while the tube is being inserted, making the work easy.

More specifically, the following is preferred. The tire of a wheel where puncture repair liquid has been injected in the tire is grounded such that the central shaft becomes horizontal. The tire is arranged such that the tire valve of the wheel is located at a position shifted by 20 degrees or more, around the central shaft or the tire, from a position directly below the central shaft. Pressurized air in the tire is discharged via the tire valve in the arranged state. The tube is inserted through the tire valve into the tire while the pressurized air in the tire is being discharged. Then, the tube is brought to the liquid surface of the puncture repair liquid by rolling the tire such that the tire valve is at the position directly below the central shaft of the tire. Especially, it is preferred that the tire be arranged such that the tire valve is located at a position shifted by 60 to 120 degrees, around the central shaft of the tire, from the position directly below the central shaft at the time of insertion of the tube from the tire valve. In this case, insertion work of the tube is completed in a state where the tire valve is at a position shifted from the position directly below the central shaft of the tire. Then, the tube may be brought to the liquid surface of the puncture repair liquid by rolling the tire such that the tire valve is at the position directly below the central shaft of the tire to recover the puncture repair liquid. Therefore, the puncture repair liquid is not discharged while the tube is being inserted, making the work easy.

Further, in the present invention, it is preferred that a coagulant to coagulate puncture repair liquid and a bag with flexibility to house the puncture repair liquid be employed. The puncture repair liquid extracted from the tire is put in the bag. The puncture repair liquid and the coagulant are mixed in the bag, and the congealed puncture repair liquid is recovered. As a result, the already-used puncture repair liquid can be easily and smoothly disposed of as a combustible waste. Objects, characteristics, aspects, and advantageous effects of the present invention will be clarified by referring to the description and the accompanying drawings below.

DESCRIPTION OF PREFERRED EMBODIMENTS

Figure 1A:
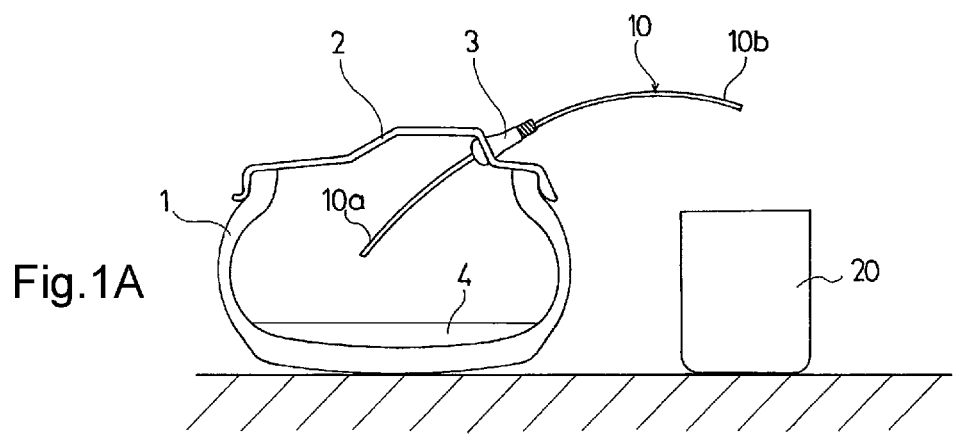
FIGS. 1A and 1B are side views illustrating respective states where insertion amounts of a tube are varied regarding a method for recovering puncture repair liquid according to an embodiment of the present invention.
Figure 1B:
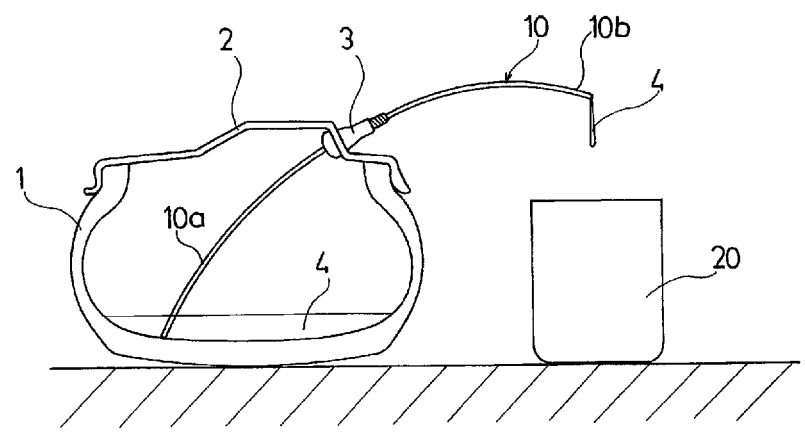
Figure 2:
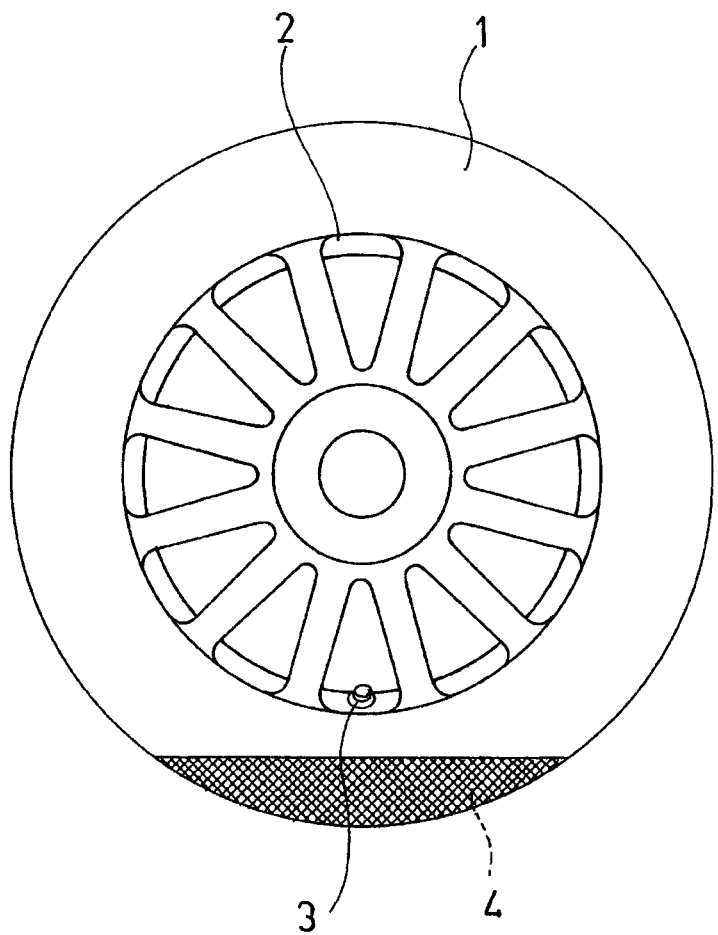
FIG. 2 is a front view illustrating a residual state of puncture repair liquid in a tire in a state where a tread surface is grounded.

A detailed description will be given of a constitution of embodiments of the present invention with reference to the attached drawings. FIGS. 1A and 1B illustrate a method for recovering puncture repair liquid according to the embodiment of the present invention. FIG. 2 illustrates a residual state of the puncture repair liquid in a tire with a tread surface grounded. In FIGS. 1A and 1B and FIG. 2, a reference numeral 1 denotes a pneumatic tire, a reference numeral 2 denotes a wheel, a reference numeral 3 denotes a tire valve mounted to the wheel, and a reference numeral 4 denotes puncture repair liquid injected in the pneumatic tire 1.

As illustrated in FIGS. 1A and 1B, with a method for recovering puncture repair liquid according to this embodiment, there is employed an apparatus for recovering puncture repair liquid including a tube 10. The tube 10 is inserted through the tire valve 3 of the wheel 2 into the tire 1. The tube 10 includes an insertion portion 10a and a protruding portion 10b. The insertion portion 10a extends from the tire valve 3 to a liquid surface of the puncture repair liquid 4. The protruding portion 10b protrudes from the tire valve 3 to the outside of the tire 1. The tube 10, which includes these insertion portion 10a and protruding portion 10b, is formed as an integrally formed product. The tube 10 has a curved shape.

To recover the puncture repair liquid using the apparatus for recovering puncture repair liquid like this, first, the wheel 2 with the tire 1 within which the puncture repair liquid 4 has been injected is in a state that pressurized air is made to be filled in the tire 1. Next, the tire 1 is grounded such that its central shaft may be horizontal. The tire 1 is disposed such that the tire valve 3 of the wheel 2 comes under the central shaft of the tire 1. Then, a valve core is removed from the tire valve 3 of the wheel 2 in the arranged state. As illustrated in FIGS. 1A and 1B, while the pressurized air in the tire 1 is being discharged through the tire valve 3, the tube 10 is inserted via the tire valve 3 up to the liquid surface of the puncture repair liquid 4, more preferably, up to the inner surface of the tire 1. This allows recovering the puncture repair liquid 4 in the tire 1 via the tube 10 using a residual pressure in the tire 1. In the case where the tube 10 cannot be inserted while the pressurized air in the tire 1 is being discharged, the following measure is taken. With the valve core removed, the tire 1 may be filled with the pressurized air through the tire valve 3, and the pressurized air in the tire 1 may be discharged again through the tire valve 3.

In the above-described extraction work of the puncture repair liquid 4, rotation of the curved tube 10 around its axis allows appropriately adjusting the distal end position of the tube 10 and efficiently absorbing the puncture repair liquid 4. The puncture repair liquid 4 may be recovered to a container 20 with an appropriate capacity. The injection amount of the puncture repair liquid 4 is, for example, approximately 450 ml at a tire size of 195/65R15. Recovering the entire amount is not necessarily required. Recovering equal to or more than 75% of the entire amount can prevent the puncture repair liquid 4 from overflowing upon removal of the tire from a rim. Recovery time in this case is approximately 4 to 5 minutes.

The puncture repair liquid 4 is preferably extracted from a tire with the tire removed from a vehicle after being temporarily repaired. Before starting the extraction work of the puncture repair liquid 4, the tire 1 is left for a while to deposit the puncture repair liquid 4 suspended in the upper portion of the tire 1 and a rim of the wheel 2 to a lower side. The shortest insertion amount of the tube 10 can be achieved by positioning the tire valve 3 at the lower side of the central shaft of the tire 1 to extract the puncture repair liquid 4. To extract the puncture repair liquid 4, the distal end of the tube 10 needs to be in the puncture repair liquid 4. Accordingly, it is preferred that the puncture repair liquid 4 be extracted while confirming the presence of the puncture repair liquid 4 by rotating the tire 1 to right and left and inclining the tire 1 back and forth.

According to the above-described method for recovering puncture repair liquid, during the recovery of the puncture repair liquid 4 in the tire 1, cutting off the tire valve 3 is not required. This allows using the tire valve 3 intact after recovery of the puncture repair liquid 4. Additionally, the tube 10 can be increased in diameter as much as possible within an allowed range of the tire valve 3. This allows the puncture repair liquid 4 to be recovered in a short time based on a residual pressure in the tire 1. Accordingly, the puncture repair liquid 4 can be efficiently recovered without cutting off the tire valve 3.

Figure 3A:
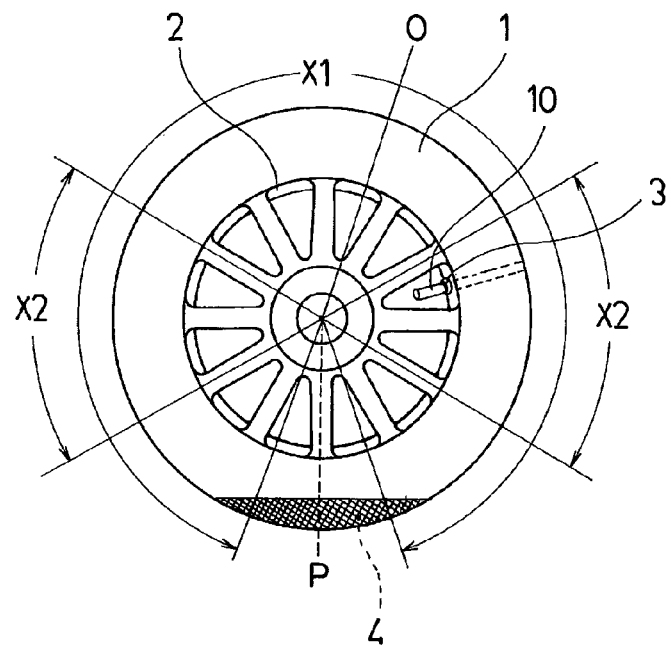
FIGS. 3A and 3B are front views illustrating respective states where rotation positions of the tires are varied regarding a method for recovering puncture repair liquid according to another embodiment of the present invention.
Figure 3B:
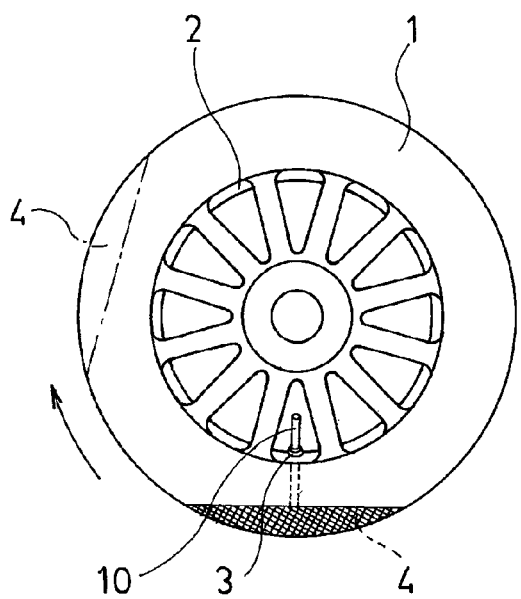

FIGS. 3A and 3B illustrate a method for recovering puncture repair liquid according to another embodiment of the present invention. In this embodiment, first, as illustrated in FIG. 3A, the puncture repair liquid 4 is injected in the tire 1, and the tire 1 with the wheel 2 where pressurized air is filled is grounded such that a central shaft O becomes horizontal. Then, the tire 1 is arranged such that the tire valve 3 of the wheel 2 is located at a position shifted by 20 degrees or more, around the central shaft O of the tire 1, from a position P directly below the central shaft O (any position in a region X1). More preferably, the tire 1 is arranged such that the tire valve 3 of the wheel 2 is located at a position shifted by 60 to 120 degrees, around the central shaft O of the tire 1, from the position P directly below the central shaft O (any position in a region X2). In this arranged state, the valve core is removed from the tire valve 3. While air is being discharged through the tire valve 3, the tube 10 is inserted up to an inner surface of the tire 1 through the tire valve 3. Then, as illustrated in FIG. 3B, the tire 1 is rolled such that the tire valve 3 comes to the position P directly below the central shaft O of the tire 1. This settles the distal end of the tube 10 in the puncture repair liquid 4, enabling recovery of the puncture repair liquid 4 in the tire 1 via the tube 10 using a residual pressure in the tire 1.

If an operation such as the above-described operation is performed, the tube 10 is fully inserted up to the inner surface of the tire 1 in a state where the tire valve 3 is at a position laterally shifted to the tire 1. After that, the tire 1 is rolled such that the tire valve 3 comes to the position P directly below the central shaft O of the tire 1 to recover the puncture repair liquid 4. Therefore, the puncture repair liquid 4 is not discharged while the tube 10 is being inserted, making the work easy. Here, if the tire valve 3 is too close to the position P directly below the central shaft O of the tire 1 at the time of insertion of the tube 10 through the tire valve 3, the puncture repair liquid 4 may be abruptly discharged. In contrast, if the tire valve 3 is too far from the position P directly below the central shaft O of the tire 1, the puncture repair liquid 4 drops on the rim of the wheel 2 along with rotation of the tire 1 and is difficult to accumulate in the lower side. These may cause insufficient recovery of the puncture repair liquid 4.

In the above-described embodiments, a description has been given in the case where the puncture repair liquid 4 is recovered while the tire 1 is grounded with the central shaft O horizontal; however, an arranged state of the tire 1 can be arbitrarily selected. For example, the tire 1 is arranged such that the central shaft O is vertical. In the arranged state, pressurized air in the tire 1 is discharged via the tire valve 3. The tube 10 is inserted through the tire valve 3 to bring the tube 10 to an inner surface of the tire 1 while the pressurized air in the tire 1 is being discharged. Then, the tire 1 may be stood while the central shaft O becomes horizontal, and the tire valve 3 may be at the position P directly below the central shaft O of the tire 1 to bring the tube 10 to a liquid surface of the puncture repair liquid 4.

Figure 4:
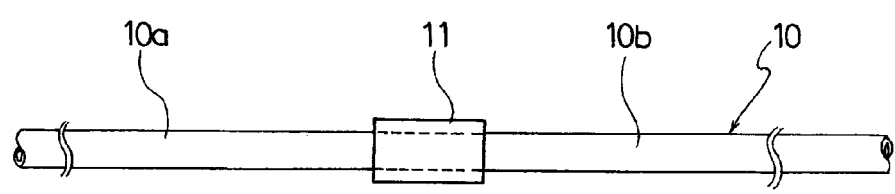
FIG. 4 is a side view illustrating an exemplary tube employed in the present invention.

FIGS. 4 to 7B illustrate a tube employed in the present invention. As illustrated in FIG. 4, a sealing portion 11 is formed in the middle of the tube 10. The sealing portion 11 has an outer diameter larger than the outer diameter of the tube 10 and can be fitted to the tire valve 3. More specifically, the sealing portion 11 is made of a pipe material thicker than the tube 10. The sealing portion 11 is slidably mounted in the longitudinal direction of the tube 10. Accordingly, the sealing portion 11 is slid along the longitudinal direction of the tube 10. This can adjust the length of the insertion portion 10a of the tube 10 according to the tire size. It is preferred that the sealing portion 11 be slidable with respect to the tube 10. The sealing portion 11 may be integrally formed with the tube 10.

Figure 5:
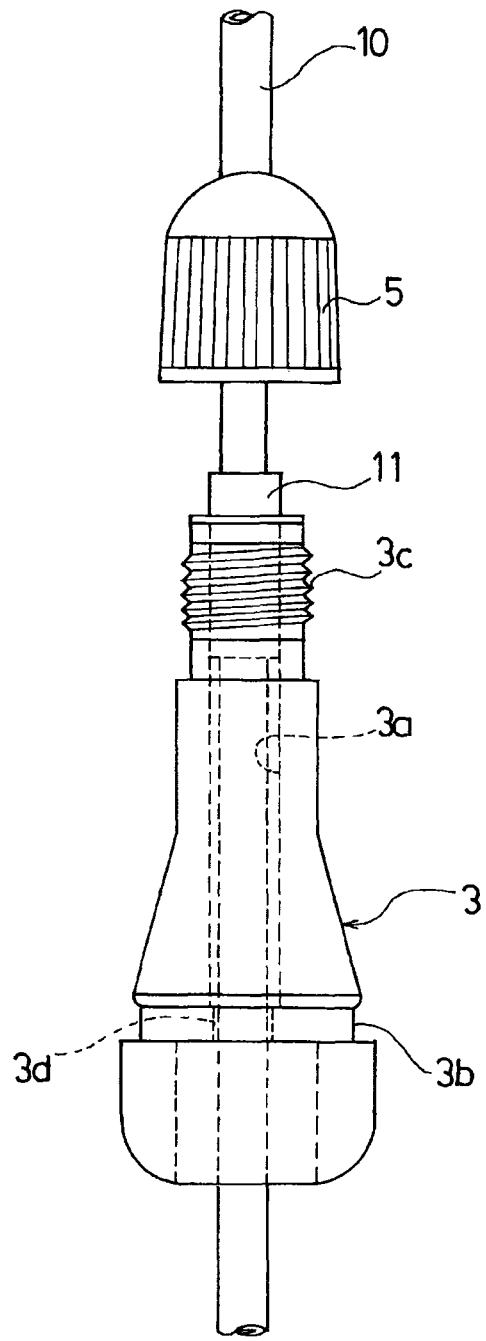
FIG. 5 is a side view illustrating a state where the tube employed in the present invention is inserted into a tire valve.

As illustrated in FIG. 5, the tire valve 3 internally includes a cylindrically-shaped through hole 3a (shown by the dashed lines). The tire valve 3 also includes a narrow portion 3b at the base end side and a male thread portion 3c at the distal end side. The narrow portion 3b is to be engaged to a mounting hole of the wheel 2. The through hole 3a includes a thinnest portion 3d where a part of the through hole 3a is locally narrowed in the longitudinal direction and an inner diameter of the through hole 3a is narrowest. During internal pressurization, a valve core is inserted into the tire valve 3.

Considering the structure of the above-described tire valve 3, the outer diameter of the tube 10 is formed smaller than the inner diameter of the thinnest portion 3d of the through hole 3a of the tire valve 3. The outer diameter of the sealing portion 11 is formed larger than the inner diameter of the thinnest portion 3d of the through hole 3a of the tire valve 3. At the top portion of a cap 5 for tire valve, a small hole where the tube 10 is inserted is formed. In the case where the cap 5 is tightened to the tire valve 3 with the tube 10 inserted into the tire valve 3 together with the sealing portion 1, the sealing portion 11 can be pressed into the tire valve 3 with the cap 5.

Thus, the sealing portion 11, which has an outer diameter larger than the outer diameter of the tube 10 and can be fitted in the tire valve 3, is disposed in the middle of the tube 10. Further, to recover the puncture repair liquid 4 in the tire 1, the sealing portion 11 is fitted to the tire valve 3. This can prevent air leakage through a gap between the tube 10 and the tire valve 3, enabling efficient recovery of the puncture repair liquid 4. To enhance air tightness, the sealing portion 11 may have a wedge shape tapered off toward the tire valve 3.

The material of the tube 10 is not especially limited. Materials such as rubber including silicone rubber, synthetic resin such as polypropylene, polyethylene, polyurethane, polyamide, and fluororesin, and a metal may be employed. Considering working efficiency in insertion of the tube 10, polyethylene and polyurethane are preferred.

The length of a portion of the tube 10 inserted into the tire may be equal to or more than 150 mm, and is preferably within the range of 150 mm to 250 mm. This is because a proper length differs depending on tire size. The length of a portion of the tube 10 outside the tire is, considering working efficiently, preferred to be approximately 50 mm to 300 mm. Accordingly, the whole length of the tube 10 is approximately 200 mm to 550 mm. It is obvious for the tube 10 that the end portion of the tube in the tire is not inserted in an appropriate position if a portion inserted into the tire is short, and the same goes for the case where the portion inserted into the tire is too long. These cases make discharge of the puncture repair liquid 4 difficult.

It is preferred that the outer diameter of the tube 10 be within the range of 2.5 mm to 3.0 mm. If the tube 10 is too thick, passing the tube 10 through the tire valve 3 is difficult. In contrast, if the tube 10 is too thin, discharge of the puncture repair liquid 4 takes much time. It is preferred that the inner diameter of the tube 10 be within the range of 50% to 90% of the outer diameter of the tube 10. This provides a certain amount of stiffness to the tube 10. Therefore, ease of insertion into the tire valve 3 is ensured while discharge efficiency of the puncture repair liquid 4 is enhanced. If the inner diameter of the tube 10 is too small, discharge efficiency of the puncture repair liquid 4 decreases. In contrast, if the inner diameter of the tube 10 is too large, the tube 10 becomes excessively flexible. These cases make insertion into the tire valve 3 difficult. For example, the inner diameter of the tube 10 may be set within the range of 1.5 mm to 2.0 mm relative to the above-described outer diameter.

On the other hand, it is preferred that the outer diameter of the sealing portion 11 be within the range of 3.2 mm to 4.0 mm. If the sealing portion 11 is too thick, pressing the sealing portion 11 into the tire valve 3 is difficult. In contrast, if the sealing portion 11 is too thin, ensuring air tightness is difficult.

Figure 6A:
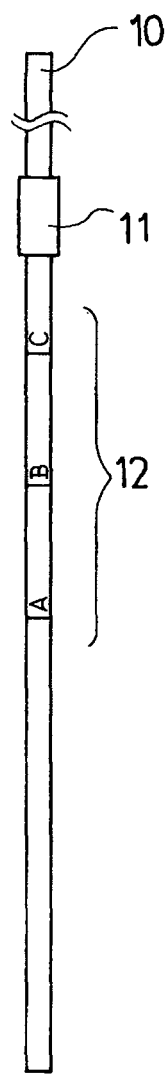
FIGS. 6A and 6B are side views illustrating an example of the main portion of the respective tubes employed in the present invention.
Figure 6B:
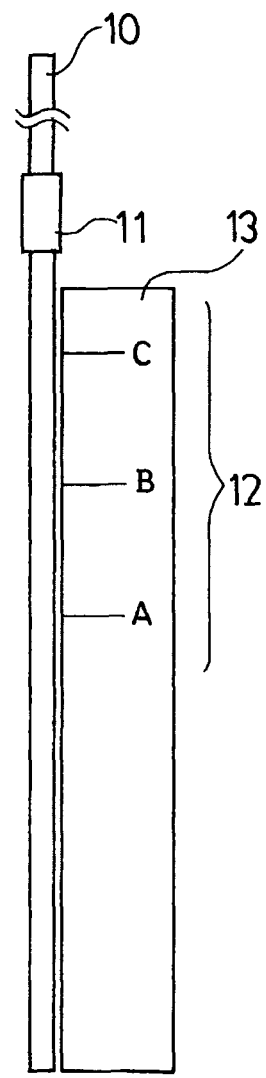

As illustrated in FIGS. 6A and 6B, the tube 10 includes a ruler 12 that indicates the position of the sealing portion 11 by alphabetical letters A to C. Based on the ruler 12, the position of the sealing portion 11 is selected according to the tire size. That is, as the length of the tube 10, dimensions applicable to all assumed tires have been set. Appropriately selecting the position of the sealing portion 11 based on the ruler 12 allows application to various tire sizes. FIG. 6A illustrates the tube 10 on which the ruler 12 is directly indicated. FIG. 6B illustrates the ruler 12 printed on a sheet 13 made of a material such as paper. The sheet 13 on which the ruler 12 is printed may be a dedicated sheet. A part of an operating manual may be used. In either case, the definition of the ruler 12 is assumed to be described in the operating manual or similar medium. For example, the operating manual describes a correspondence relationship between the alphabetical letters A to C on the ruler 12 and the tire sizes. The ruler 12 may indicate a tire size by employing different line thicknesses, different line colors, different numbers of lines, or similar specification. The ruler 12 may also indicate a tire size by numerals, signs, or similar characters instead of the above-described alphabetical letters.

Figure 7A:
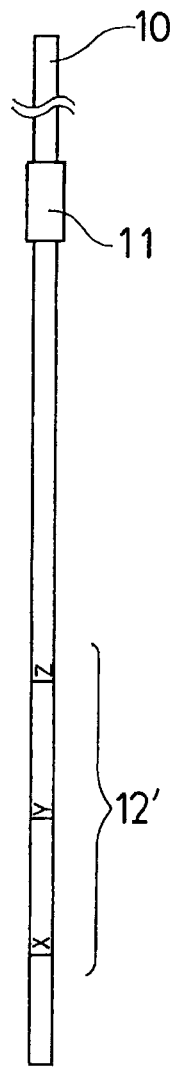
FIGS. 7A and 7B are side views illustrating an example of the main portion of the respective tubes employed in the present invention.
Figure 7B:
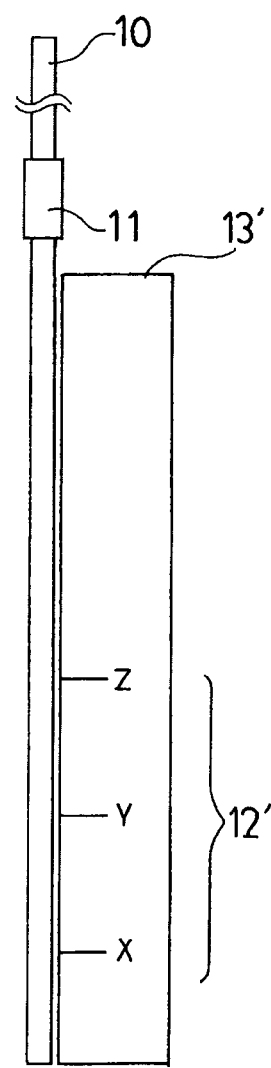

As described above, instead of changing the position of the sealing portion 11, as illustrated in FIGS. 7A and 7B, the tube 10 may include a ruler 12' indicating a cut length by alphabetical letters X to Z. The tube 10 may be cut off according to the tire size based on the ruler 12'. That is, as the length of the tube 10 before use, the dimensions where the tube 10 reaches from the tire valve 3 to an inner surface of the tire 1 have been set regarding all assumed tires. Appropriately cutting off the tube 10 based on the ruler 12' allows application to various tire sizes. FIG. 7A illustrates the tube 10 on which the ruler 12' is directly indicated. FIG. 7B illustrates the ruler 12' printed on a sheet 13' made of a material such as paper. The sheet 13' on which the ruler 12' is printed may be a dedicated sheet. A part of an operating manual may be used. In either case, the definition of the ruler 12' is assumed to be described in the operating manual or similar medium. For example, the operating manual describes a correspondence relationship between the alphabetical letters X to Z on the ruler 12' and the tire sizes. The ruler 12' may indicate a tire size by employing different line thicknesses, different line colors, different numbers of lines, or similar specification. The ruler 12' may also indicate a tire size by numerals, signs, or similar characters instead of the above-described alphabetical letters.

With the above-described method for recovering puncture repair liquid, the constitution of the tube 10 is not especially limited. For example, as illustrated in FIG. 4, the tube 10 may be an integrally formed product that includes an insertion portion 10a and a protruding portion 10b. The insertion portion 10a extends from the tire valve 3 to an inner surface of the tire 1. The protruding portion 10b protrudes from the tire valve 3 to the outside of the tire 1. Additionally, the tube 10 may be a member with which another pipe member is combined.

Figure 8:
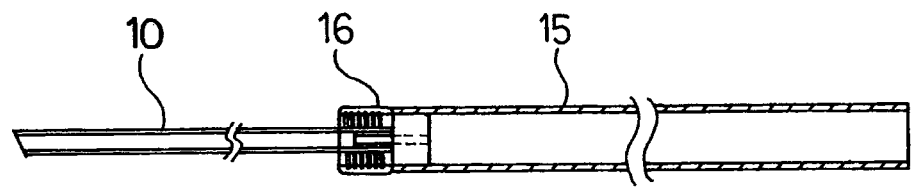
FIG. 8 is a side view illustrating an assembly of the tube and a pipe member employed in the present invention.
Figure 9:
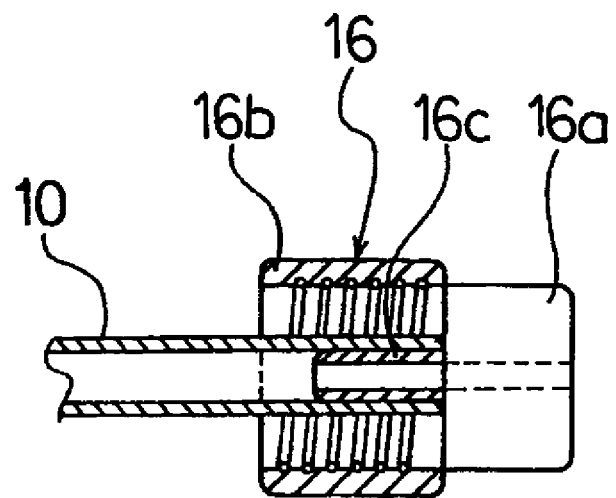
FIG. 9 is an enlarged cross-sectional view illustrating a coupling structure of the tube and the pipe member in FIG. 8.
Figure 10:
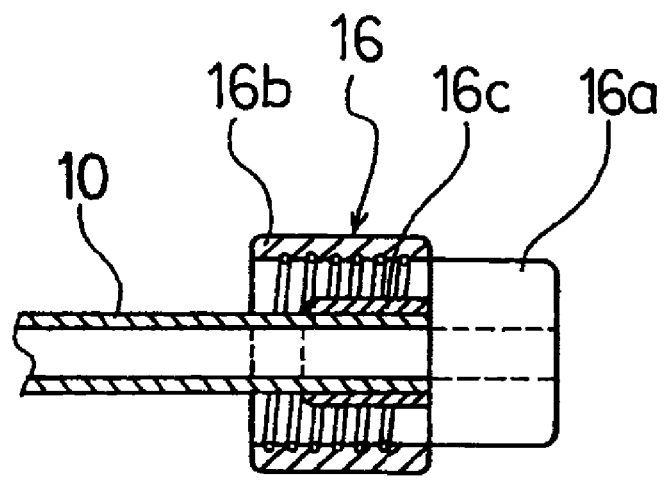
FIG. 10 is a cross-sectional view illustrating a modification of the coupling structure of the tube and the pipe member in FIG. 8.

FIGS. 8 to 10 illustrate an assembly of the tube and the pipe member employed in the present invention. As illustrated in FIG. 8, the tube 10 and a pipe member 15, which is thicker than the tube 10, are communicated with each other and coupled via a coupling member 16. The coupling member 16 includes, as illustrated in FIG. 9, a cylindrically-shaped fixed portion 16a, a coupling portion 16b, and a cylindrically-shaped protrusion 16c. The cylindrically-shaped fixed portion 16a is engaged to and secured to the pipe member 15. The coupling portion 16b includes a female thread portion engaged to the tire valve 3. The cylindrically-shaped protrusion 16c holds the end portion of the tube 10. In the example in FIG. 9, the cylindrically-shaped protrusion 16c is inserted into the tube 10. In the example in FIG. 10, the tube 10 is inserted into the cylindrically-shaped protrusion 16c. In the former case, the outer diameter of the cylindrically-shaped protrusion 16c needs to be smaller than the inner diameter of the tube 10, and therefore the flow rate of the puncture repair liquid 4 is reduced. In the latter case, the flow rate of the puncture repair liquid 4 is sufficiently ensured.

To employ the above-described assembly including the tube 10 and the pipe member 15, a valve core is removed from the tire valve 3. The tube 10 is inserted via the tire valve 3 to bring the tube 10 to a liquid surface of the puncture repair liquid 4 while the air is being discharged through the tire valve 3. The coupling portion 16b of the coupling member 16 is engaged to the tire valve 3. This allows recovering the puncture repair liquid 4 in the tire 1 using a residual pressure in the tire 1 via the tube 10 and the pipe member 15.

Thus, the tube 10 requires a length to be inserted through the tire valve 3 into the tire 1 at least to reach a liquid surface of the puncture repair liquid 4. Meanwhile, another member such as the pipe member 15 may be coupled outside the tire valve 3.

With the above-described embodiments, the puncture repair liquid 4 is recovered via the tube 10. As a recovery container, a flexible bag is applicable in addition to a bucket, a bottle, or similar member. It is preferred that the puncture repair liquid 4 be coagulated in the flexible bag with coagulant.

Figure 11:
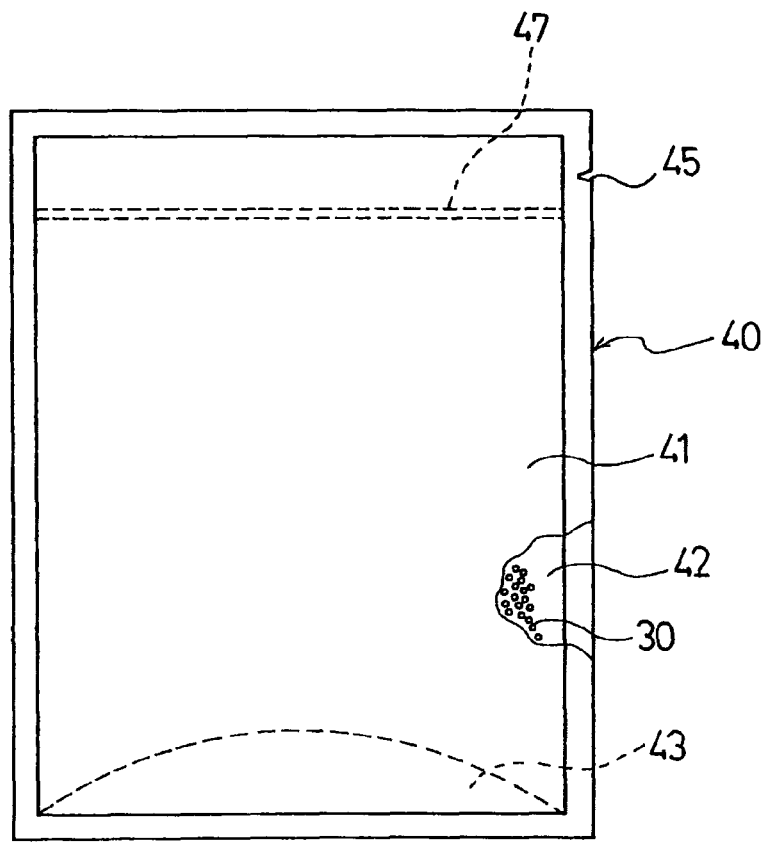
FIG. 11 is a side view illustrating a partially cutout bag with flexibility where a coagulant employed in the present invention is sealed.
Figure 12:
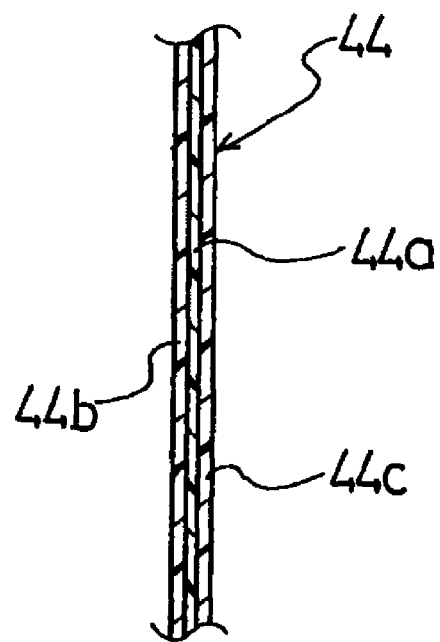
FIG. 12 is an enlarged cross-sectional view illustrating a laminated film constituting the bag of FIG. 11.
Figure 13:
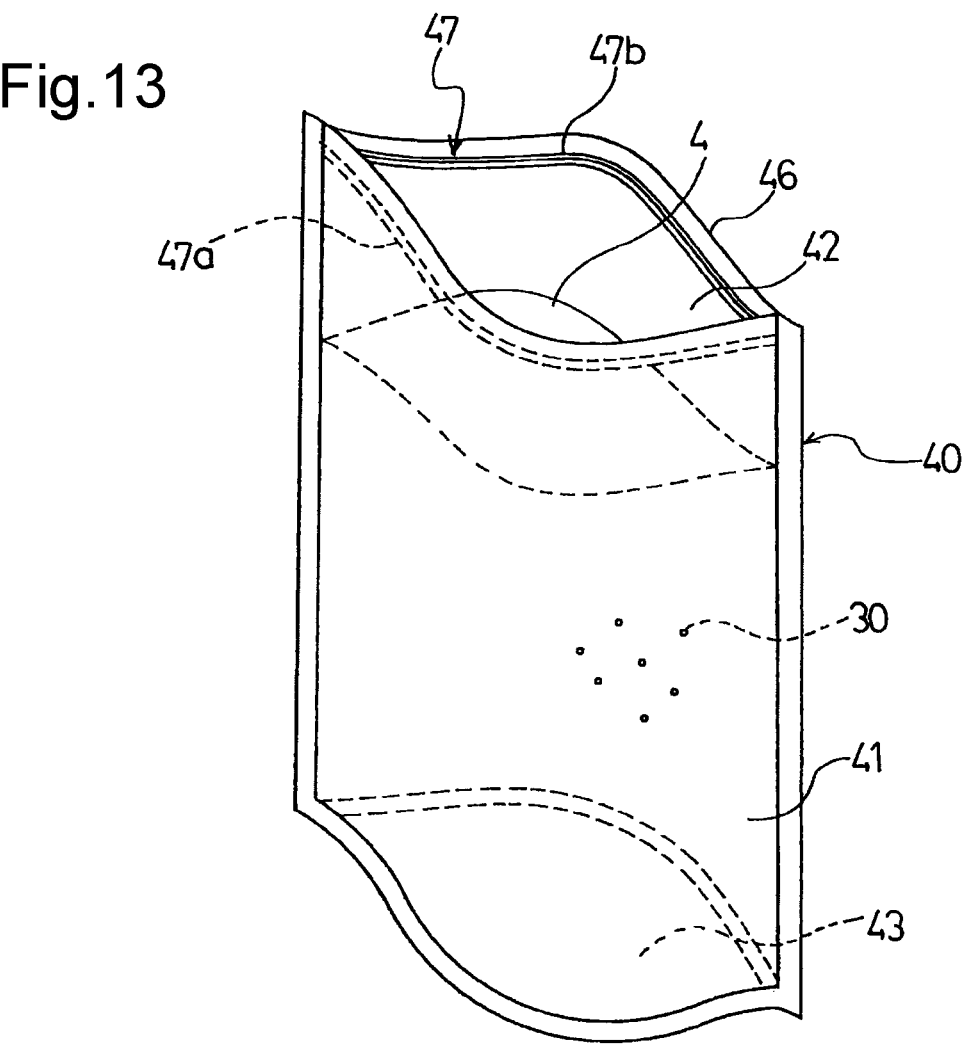
FIG. 13 is a perspective view illustrating the bag of FIG. 11 in use.

FIGS. 11 to 13 illustrate the flexible bag where coagulant employed in the present invention is sealed. As illustrated in FIG. 11, the apparatus for recovering puncture repair liquid according to the present embodiment includes a coagulant 30 and a bag 40. The coagulant 30 coagulates the puncture repair liquid. The bag 40 has flexibility to house the puncture repair liquid.

The coagulant 30 is not especially limited insofar as the coagulant 30 coagulates the puncture repair liquid that contains emulsion particles. For example, the coagulant disclosed in JP-A-2009-41006 may be employed. This coagulant contains a mineral and a gelatinizing agent that cause the emulsion particles to aggregate.

As the above-described mineral, at least one kind of mineral selected from the group consisting of silicate, oxide, and carbonate is applicable. For example, as the mineral, at least one kind of mineral selected from the group consisting of alumina, sodium silicate, magnesium silicate, aluminum silicate, montmorillonite, bentonite, and zeolite may be employed.

On the other hand, as a gelatinizing agent, at least one kind of a gelatinizing agent selected from the group consisting of polyethylene oxide, polypropylene oxide, hydroxyethyl cellulose, and modified polymers thereof, alginate sodium, propylene glycol alginate, and dibenzylidene sorbitol may be employed.

The amount of the gelatinizing agent may be 20 to 700 parts by weight. and is preferably 60 to 200 parts by weight. with respect to 100 parts by weight. of the mineral. However, the above-described coagulant can contain additive, for example, filler, age resister, oxidation inhibitor, pigment (dye), plasticizer, thixotropy-imparting agent, ultraviolet absorbing agent, flame-retardant agent, surfactant, dispersant, dehydrating agent, or antistatic agent as well as the mineral and the gelatinizing agent as necessary.

On the other hand, the flexible bag 40 is formed by heat-sealing two side sheets 41 and 42 made of a laminated film 44 and one gusset 43 made of the laminated film 44 one another. The bag 40 includes preliminarily sealed coagulant 30. Further, it is preferred that the bag 40 have a capacity of 700 ml to 2000 ml to house the puncture repair liquid recovered from the tire. The gusset 43 is disposed at the lower portion of the bag 40. The gusset 43 is folded when not used; however, the gusset 43 may be always open. In either case, with the gusset 43 open, the bag 40 has a structure where a three-dimensional shape is formed and the bag 40 can stand alone.

The laminated film 44 includes, as illustrated in FIG. 12, a middle layer 44a, an inner layer 44b, and an outer layer 44c. The middle layer 44a has a gas barrier property. The inner layer 44b is laminated on the inner side of the middle layer 44a. The outer layer 44c is laminated on the outer side of the middle layer 44a. As a material constituting the middle layer 44a, a metal foil such as aluminum foil is applicable in addition to a synthetic resin with low gas permeability such as ethylene vinyl alcohol copolymer (EVOH), polyamide (PA), polyvinylidene chloride (PVDC), polyvinyl alcohol (PVA), MX nylon (MXD6), and polyacrylonitrile resin (PAN). On the other hand, as a material constituting the inner layer 44b and the outer layer 44c, a synthetic resin such as polyethylene, polyester, and nylon are applicable to ensure mechanical strength and weather resistance. It is preferred that the inner layer 44b and the outer layer 44c be made of the same material. The inner layer 44b and the outer layer 44c may be made of mutually different materials according to required characteristics.

In the case of synthetic resin, the thickness of the middle layer 44a may be 5 μm to 200 μm. In the case of a metal foil such as aluminum foil, the thickness may be 1 nm to 500 nm, and is preferably 5 nm to 200 nm. If the middle layer 44a is too thin, this may cause reduction in the gas barrier property. In contrast, if the middle layer 44a is too thick, this may cause reduction in flexibility. Further, each thickness of the inner layer 44b and the outer layer 44c is preferably 5 μm to 100 μm. If the inner layer 44b and the outer layer 44c are too thin, durability when mixing the puncture repair liquid and the coagulant is reduced. Conversely, if the inner layer 44b and the outer layer 44c are too thick, the flexibility is reduced.

Each of the inner layer 44b and the outer layer 44c may be a single layer or may be a plurality of layers made of different materials. For the plurality of layers, the total thickness is preferably 5 μm to 100 μm.

A notch 45 is disposed at the upper side edge portion of the bag 40. The upper end portion of the bag 40 is torn with this notch 45 set as a starting point. Thus, an opening 46 (see FIG. 13) is formed. The bag 40 includes a sealing belt 47 along the opening 46. The structure of the sealing belt 47 is not especially limited insofar as the sealing belt 47 can seal the opening 46. For example, the sealing belt 47 can include a groove 47a at one side sheet 41 and a protrusion 47b at another side sheet 42. The groove 47a extends along the opening 46. The protrusion 47b extends along the opening 46 and elastically fits to the groove 47a.

To recover the puncture repair liquid 4 using the above-described coagulant 30 and bag 40, as illustrated in FIG. 13, the upper end of the bag 40 containing the coagulant 30 is opened, and the puncture repair liquid 4 extracted from the tire 1 is put in the bag 40. Next, after the opening 46 of the bag 40 is sealed with the sealing belt 47, the flexible bag 40 is crumpled to mix the puncture repair liquid 4 and the coagulant 30, thus the puncture repair liquid 4 is coagulated in the bag 40. As a result, the already-used puncture repair liquid 4 can be easily and smoothly disposed of together with the bag 40 as a combustible waste.

With the above-described method for recovering puncture repair liquid, the sealing belt 47 is disposed at the opening 46 of the flexible bag 40. This can surely prevent an overflow of the puncture repair liquid 4 upon crumpling the bag 40.

Additionally, the flexible bag 40 is constituted of the laminated film 44 including the middle layer 44a with a gas barrier property, and the coagulant 30 has been preliminary sealed in the bag 40. Therefore, the contained coagulant 30 is not exposed to the air, thus enabling maintaining the quality over a long period of time.

Further, the bag 40 has a structure with the gusset 43 at the lower portion so as to stand alone. The bag 40 need not be supported at the time of extracting the puncture repair liquid 4 from the tire 1. Accordingly, there is an advantage that all recovery work can be performed by one person even if an operation of a tube or similar is required when the puncture repair liquid 4 is extracted from the tire 1.

The above-described embodiment has been described using a flexible bag that includes a laminated film, which includes a middle layer with a gas barrier property, and has preliminary sealed the coagulant inside the bag. In the present invention, a soft plastic bag or similar member may be employed as a flexible bag, and the coagulant may be sealed in another package with a gas barrier property. In that case, the coagulant and the puncture repair liquid may be simply put in the flexible bag together and then mixed.

This application is based on Japanese Patent Application No. 2010-259493 filed on Nov. 19, 2010 in Japan by the applicant of this application, the entire contents of which are incorporated herein by reference. Additionally, the entire contents of JP-A-2009-41006, JP-A-2003-127242, JP-A-10-67212, U.S. Pat. No. 5,927,348, and JP-A-2007-331210 recited as the background art of the present invention are also incorporated herein by reference.

The above description of a specific embodiment of the present invention is disclosed as illustrative. This does not intend to be exhaustive or limit the present invention to the described embodiments as they are. Many modifications and variations will be apparent to one of ordinary skill in the art in light of the above teachings.

DESCRIPTION OF REFERENCE SIGNS 1 pneumatic tire
2 wheel
3 tire valve
4 puncture repair liquid
5 cap
10 tube
11 sealing portion
12, 12' ruler
13, 13' sheet
20 container
30 coagulant
40 bag

The invention claimed is:

1. A method for recovering puncture repair liquid, comprising:
   preparing a tube to be inserted into a tire through a tire valve mounted to a wheel;
   removing a valve core from the tire valve of the wheel with the tire where puncture repair liquid has been injected;
   discharging, through the tire valve, pressurized air filled in the tire;
   inserting the tube through the tire valve so as to bring the tube to a liquid surface of the puncture repair liquid while discharging the pressurized air in the tire; and
   recovering the puncture repair liquid in the tire via the inserted tube using a residual pressure in the tire,
   wherein the method further comprises:
   grounding the tire of the wheel were the puncture repair liquid has been injected in the tire such that a central shaft of the tire becomes horizontal; and
   arranging the tire such that the tire valve of the wheel is located at a position shifted by 20 degrees or more, around the central shaft of the tire, from a position directly below the central shaft, wherein
   the discharging the pressurized air via the tire valve includes discharging the pressurized air in the arranged tire via the tire valve, and
   the inserting the tube includes:
   inserting the tube through the tire valve into the tire while the pressurized air in the tire is being discharged; and
   bringing the tube to the liquid surface of the puncture repair liquid by rolling the tire after the insertion such that the tire valve is at the position directly below the central shaft of the tire.

2. The method for recovering puncture repair liquid according to claim 1, wherein
   as the tube, a tube that has an outer diameter smaller than an inner diameter of a thinnest portion of a through hole of the tire valve and has an inner diameter within a range of 50% to 90% of the outer diameter is prepared.

3. The method for recovering puncture repair liquid according to claim 2, wherein
   as the tube, a tube that has an outer diameter within a range of 2.5 mm to 3.0 mm is prepared.

4. The method for recovering puncture repair liquid according to claim 1, wherein
   the arranging the tire includes arranging the tire such that the tire valve is located at a position shifted by 60 to 120 degrees, around the central shaft of the tire, from the position directly below the central shaft when inserting the tube through the tire valve.

5. The method for recovering puncture repair liquid according to claim 1, further comprising:
   preparing a coagulant to coagulate puncture repair liquid; and
   preparing a bag with flexibility to house the puncture repair liquid, wherein
   the recovering puncture repair liquid includes recovering the puncture repair liquid in a coagulated state, the puncture repair liquid being coagulated by putting puncture repair liquid extracted from the tire into the bag, and mixing the puncture repair liquid and the coagulant in the bag.

6. The method for recovering puncture repair liquid according to claim 2, wherein
   the arranging the tire includes arranging the tire such that the tire valve is located at a position shifted by 60 to 120 degrees, around the central shaft of the tire, from the position directly below the central shalt when inserting the tube through the tire valve.

7. The method for recovering puncture repair liquid according to claim 3, wherein
   the arranging the tire includes arranging the tire such that the tire valve is located at a position shifted by 60 to 120 degrees, around the central shaft of the tire, from the position directly below the central shaft when inserting the tube through the tire valve.

8. The method for recovering puncture repair liquid according to claim 2, further comprising:
   preparing a coagulant to coagulate puncture repair liquid; and
   preparing a bag with flexibility to house the puncture repair liquid, wherein
   the recovering puncture repair liquid includes recovering the puncture repair liquid in a coagulated state, the puncture repair liquid being coagulated by putting puncture repair liquid extracted from the tire into the bag, and mixing the puncture repair liquid and the coagulant in the bag.

9. The method for recovering puncture repair liquid according to claim 3, further comprising:
   preparing a coagulant to coagulate puncture repair liquid; and
   preparing a bag with flexibility to house the puncture repair liquid, wherein
   the recovering puncture repair liquid includes recovering the puncture repair liquid in a coagulated state, the puncture repair liquid being coagulated by putting puncture repair liquid extracted from the tire into the bag, and mixing the puncture repair liquid and the coagulant in the bag.

10. The method for recovering puncture repair liquid according to claim 4, further comprising:
    preparing, a coagulant to coagulate puncture repair liquid; and
    preparing a bag with flexibility to house the puncture repair liquid, wherein
    the recovering puncture repair liquid includes recovering the puncture repair liquid in a coagulated state, the puncture repair liquid being coagulated by putting puncture repair liquid extracted from the tire into the bag, and mixing the puncture repair liquid and the coagulant in the bag.

* * * * *